United States Patent [19]
Grant

[11] Patent Number: 6,067,358
[45] Date of Patent: May 23, 2000

[54] ERGONOMIC CELLULAR PHONE

[76] Inventor: Alan H. Grant, 3208 Woodhollow Dr., Chevy Chase, Md. 20815

[21] Appl. No.: 09/047,359

[22] Filed: Mar. 25, 1998

[51] Int. Cl.$^7$ ..................................................... H04M 1/00
[52] U.S. Cl. .............................................................. 379/433
[58] Field of Search ..................................... 379/368, 433, 379/428; 455/575, 90; 341/34, 184

[56] References Cited

U.S. PATENT DOCUMENTS

| | | |
|---|---|---|
| D. 203,994 | 3/1966 | Brandlein et al. . |
| D. 210,775 | 4/1968 | Dreyfuss . |
| D. 248,650 | 7/1978 | Bellenger et al. . |
| D. 258,656 | 3/1981 | Vaughan et al. . |
| D. 284,761 | 7/1986 | Ryan . |
| D. 285,197 | 8/1986 | Bressler et al. . |
| D. 285,200 | 8/1986 | Bressler et al. . |
| D. 291,440 | 8/1987 | Yoshiharu . |
| D. 295,626 | 5/1988 | Watanabe . |
| D. 298,242 | 10/1988 | Watanabe . |
| D. 300,743 | 4/1989 | Zaugg et al. . |
| D. 319,468 | 8/1991 | Larizza . |
| D. 326,451 | 5/1992 | Roegner . |
| D. 339,128 | 9/1993 | Claxton et al. . |
| D. 345,157 | 3/1994 | Happo et al. . |
| D. 357,679 | 4/1995 | Fellinger . |
| D. 366,876 | 2/1996 | Labohm . |
| D. 368,475 | 4/1996 | Scott . |
| D. 368,711 | 4/1996 | Wicks et al. . |
| D. 375,748 | 11/1996 | Hartman . |
| D. 378,678 | 4/1997 | Tyneski et al. . |
| 3,005,055 | 10/1961 | Mattke ..................................... 341/184 |
| 3,632,878 | 1/1972 | Stratman . |
| 3,872,263 | 3/1975 | Wilder et al. . |
| 3,908,288 | 9/1975 | Brown, Jr. . |
| 4,042,793 | 8/1977 | Bellenger . |
| 4,179,584 | 12/1979 | Tanimoto et al. . |
| 4,572,403 | 2/1986 | Benaroya . |
| 4,623,970 | 11/1986 | Toyomura . |
| 4,706,288 | 11/1987 | Hashimoto et al. . |
| 4,713,836 | 12/1987 | Suzuki . |
| 4,926,474 | 5/1990 | Marks . |
| 5,095,503 | 3/1992 | Kowalski . |
| 5,175,869 | 12/1992 | Murata . |
| 5,222,121 | 6/1993 | Shimada . |
| 5,311,175 | 5/1994 | Waldman ................................... 341/34 |
| 5,332,322 | 7/1994 | Gambaro . |
| 5,479,163 | 12/1995 | Samulewicz . |

Primary Examiner—Jack Chiang
Attorney, Agent, or Firm—Jacobson, Price, Holman & Stern, PLLC

[57] ABSTRACT

A hand held telephone having twelve push buttons arranged in a clock face orientation around a centrally located swivel button. The push buttons are arranged so that the number one button is arranged at approximately a one o'clock orientation, the number two button is set approximately at a two o'clock orientation and so on through the number nine button at an approximate nine o'clock orientation. A zero button is positioned at the approximate 10 o'clock orientation and "*" (star) button is positioned at an approximate eleven o'clock orientation and the "#" (pound) button is positioned at an approximate twelve o'clock orientation. By arranging the buttons normally found on a telephone in a clock face orientation, it is possible to move the forefinger of an individual to the approximate clock setting so as to key actuate an appropriate number. This can be accomplished without visually focusing on the clock face. In addition, upon actuation of the numbered buttons, a synthesized voice indication is made of the button depressed so as to confirm the correct actuation. The centrally located swivel button includes a pivot pin by which the tip of the forefinger of an individual can guide the swivel button clockwise or counter-clockwise until reaching a desired approximate clock hour orientation. Then upon tilting depression of the pivot pin, if properly positioned, the pin will provide the feel of the pin engaging a detent and simultaneously will complete an electrical circuit for synthesized voice announcement of a particular dial number of the telephone. The synthesized voice confirms the correct positioning of the pivot pin so as to dial a predetermined number.

14 Claims, 3 Drawing Sheets

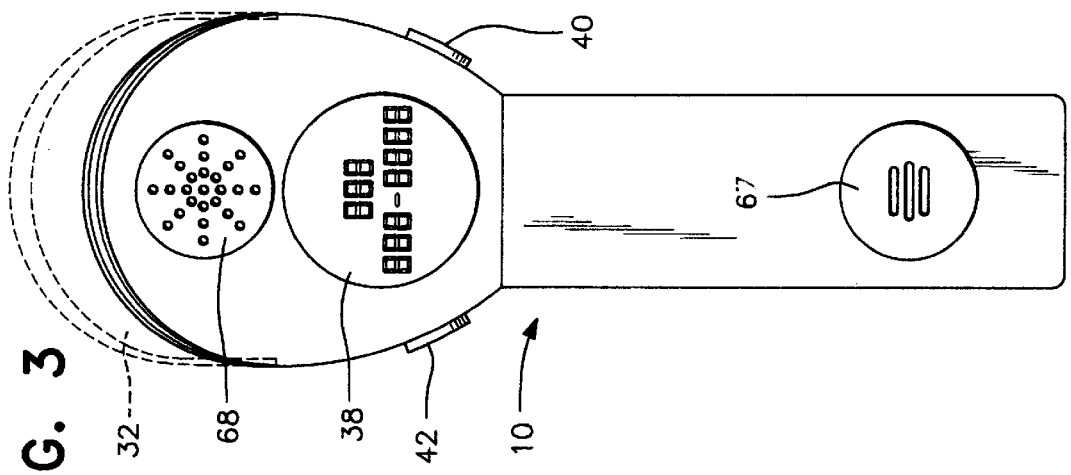
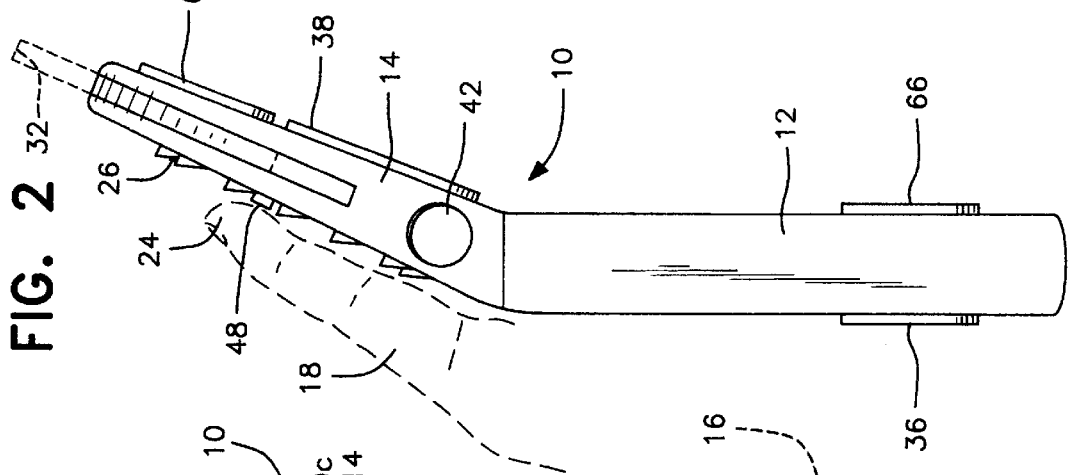
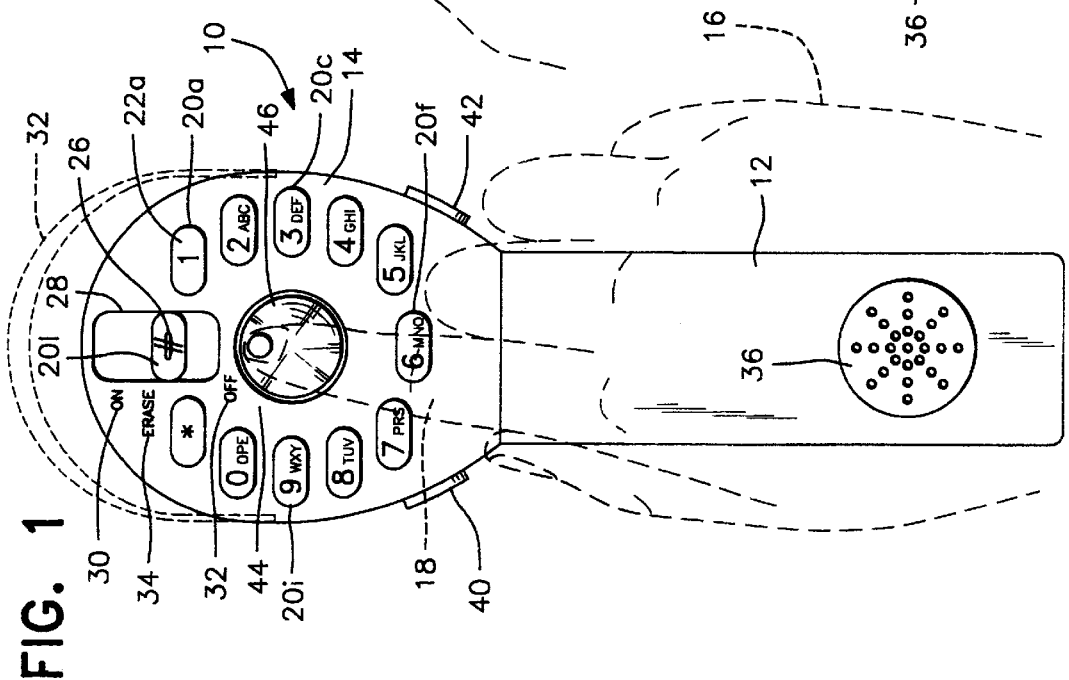

ERGONOMIC CELLULAR PHONE

FIELD OF THE INVENTION

The present invention eliminates visual and physical distractions of looking at a key pad of telephone to dial the telephone.

BACKGROUND OF THE INVENTION

Traditionally, telephones have required the use of two hands plus the necessity of visual attention to the dialing mechanism. One hand acquires the mouthpiece/receiver combination (the handset) and the other hand, with visual guidance, initiates and completes the dialing sequence.

With the advent of portable, cellular telephones, there remains significant visual demand to initiate and dial the telephone. This has become a very dangerous distraction to the user, especially when the user is driving an automobile. Passengers, pedestrians, other vehicles and many other physical obstacles are placed at increased risk.

As an example, taking one's eyes away from the road to view the dialing mechanism of a telephone at a minimum, represents a three to six second visual lapse in attention to safe-driving. It is unlikely that drivers who routinely use portable phones while in transit, will decelerate and pull off to the side of the road and come to a stop to safely utilize this communication device. Even when a driver is paying full visual attention to driving, at routine highway speeds, when the brakes are applied, the vehicle will travel approximately 500 feet before coming to a full stop. Local city driving is equally hazardous because although vehicle speed is slower, traffic is heavier, with the separation between vehicles being less than on the highway, and there is less time to react to visual distractions.

Telephone dialing time has progressively increased because more digits have to be activated to complete the desired dialing string. Local calls, formerly of a 7-digit string, have recently required inclusion of an area code, thereby lengthening to a 10-digit string. Long distance calls now require an 11-digit string, and overseas calls require a 13–15 digit string.

When routinely-called number are programmed in the telephone, abbreviated dialing numbers are substituted for the full string of dialing digits. The dialing-time may be somewhat shorter, but there still is a lapse in visual attention to driving.

The driver-user of a cellular telephone usually takes one hand off the driving wheel to access and manually manipulate the telephone. During this time interval their gaze is directed to visually access the dialing mechanism. When pre-programmed telephone numbers are not available, then the user encounters a longer time-interval in which to dial a string of digits during which their visual attention is directed to other than safe driving.

Some users prefer to manipulate the dialing sequence with the same hand that is holding the handset. In this instance, what usually happens is that it is the thumb which accesses each digit. The thumb is shorter and is relatively massive because of its two joints and has less motility than the fingers to sequentially activate the appropriate string of digits. Use of the thumb to dial is therefore cumbersome, visually demanding upon the user, and takes an extended time to execute the dialing string.

Another disadvantage in attempting to dial a telephone while driving is dysmetria. Dysmetria is the visual undershooting or overshooting of the exact position of visual fixation on the desired target (the dialing mechanism). In shifting visual gaze from road to a relatively small telephone dial, the eyes almost always cause an initial miss of the target and a secondary and sometimes a tertiary fixation is required to accurately focus on the dialing mechanism.

Further, the greater the angular difference between straight-ahead viewing of the road, and the location of the telephone, the greater will be the dysmetria effect. Usually cellular telephones are located significantly below the windshield with a large angular difference from straight-ahead viewing of 40 to 70 degrees. Each successive fixation of the eyes on the telephone expends more time and therefore increases the lapse of visual attention from the primary function of safely operating a motor vehicle.

Whether the telephone that is utilized during driving is hands-free, or hand-held, it is important not to have to look at the dialing mechanism. It is also important to shape the telephone and position the various controls so that the device can be grasped and held in a prehensile manner. A prehensile manner allows the controls of a telephone to be activated in a naturally-grasping motion where the thumb is moving toward the fingers. This affords greater tactile familiarity with the tool and thereby lessens the visual demand to be looking at the telephone.

SUMMARY OF THE INVENTION

Accordingly, it is an object of the present invention to eliminate the visual demand while using a telephone, cellular phone or cordless phone by creating a visual mnemonic, by posturing the telephone dial in the form of a universally known and remembered analogue clock face. In addition, the physical structure of the telephone and the positioning of the control keys has been determined so that the device may be acquired and operated in a prehensile manner, thus providing greater tactile familiarity with the device. Audio feedback is provided to the user so that each dialing digit and control key broadcasts back to the user the action invoked by the actuation of that specific key.

The object of the present invention is accomplished by a hand held telephone having twelve push buttons arranged in a clock face orientation around a centrally located swivel button. The push buttons are arranged so that the number one button is arranged at approximately a one o'clock orientation, the number two button is set approximately at a two o'clock orientation and so on through the number nine button at an approximate nine o'clock orientation. A zero button is positioned at the approximate 10 o'clock orientation, a "*" (star) button is positioned at an approximate eleven o'clock orientation and a "#" (pound) button is positioned at an approximate twelve o'clock orientation.

By arranging the buttons normally found on a telephone in a clock face orientation, it is possible to move the forefinger of an individual to the approximate clock setting so as to key actuate an appropriate number. This can be accomplished without visually focusing on the clock face.

In addition, upon actuation of the numbered buttons, a synthesized voice indication is made of the button depressed so as to confirm the correct actuation. One example of the use of a synthesized voice to indicate actuation of electronic equipment is provided in U.S. Pat. No. 4,623,970, herein incorporated in its entirety by reference.

In addition, a centrally located swivel button includes a pivot pin by which the tip of the forefinger of an individual can guide the swivel button clockwise or counter-clockwise until reaching a desired approximate clock hour orientation. Then upon tilting of the pivot pin, if properly positioned, the pin will provide the feel of engagement with a detent and simultaneously will complete an electrical circuit for synthesized voice announcement of a particular dial number of the telephone. The synthesized voice confirms the correct positioning of the pivot pin so as to dial a predetermined number.

In the event that an incorrect number is actuated, either by the separately numbered push buttons or the centrally located swivel button, the "#" button positioned at the twelve o'clock setting, is movable into various positions, one of which being an erase mode for erasing the last entered number. A synthesized voice confirms erasure of the last entered number. By keeping the pound button in the erase position, all of the previously entered numbers in a sequence are erased as compared to the momentary movement of the pound button to the erase position for erasing the last entered number.

The pound switch is also movable into a position to initially energize the telephone which simultaneously causes extension of an antenna from a recessed position at the top of the telephone. Another movement of the pound button turns off power to the telephone.

Two buttons positioned on opposite sides of the handset provide a "SEND" function to cause a dialed string of numbers to be transmitted to place a call. A second depression of one of these two buttons cancels or ends a completed call.

By having two buttons located on opposite sides of the hand set which accomplish the same purpose, both right handed and left handed operators are accommodated. Positioning of these buttons for actuation by the thumb of the operator is consistent with the desired prehensile orientation of the operator's hand on the handset.

On the same side of the handset as the number pad is located a speaker for emitting the synthesized voice indicative of operation of a particular function. This speaker can also serve as a loud speaker when the telephone is used in a hands free operation.

On the opposite side of the handset is located a loud speaker and a microphone for traditional use of the handset as a hand held telephone. Also, a display panel is positioned between the loud speaker and microphone for display of numbers dialed as well as other transmitted information.

Accordingly, it is another object of the present invention to provide a telephone which is actuable by buttons or switches arranged in a clock face pattern and a centrally located pivotal switch with a synthesized voice indicating actuation of a switch for a particular number to be dialed.

It is yet another object of the present invention to provide a telephone having numerical actuating buttons or switches arranged in a clock face pattern with the corresponding button number arranged at a particular approximate clock face orientation on the clock face.

It is yet another object of the present invention to provide a telephone having a dialing mechanism including a swivel button with a pivot pin extending therefrom for engagement with the tip of the forefinger of an operator so as to rotate the pivot pin in a clockwise or counter-clockwise direction until positioning the pin in an approximate clock number orientation indicative of a telephone number to be dialed which is actuated by a tilting of the pivot pin.

It is still yet another object of the present invention to provide a telephone handset including an elongated base portion and a head portion extending at an angle with respect to the base portion with the head portion including a plurality of contact buttons indicative of a number to be dialed by the telephone and including a loud speaker on the same side of the handset as the contact buttons and a loud speaker and a microphone located on an opposite side of the handset.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a top plan view of the handset of the present invention, an extended antenna being shown in dotted lines and the orientation of the hand of an operator in a prehensile orientation also being shown in dotted lines with the tip of the forefinger of the operator being positionable on a pivot pin of a central swivel button and also being able to engage a plurality of spaced contact buttons arranged in a clock face orientation.

FIG. 2 is a side view of the handset illustrating the inclined surface of each of the contact buttons indicative of a particular phone number and also illustrating the microphone, loud speaker and display section located on the rear of the handset.

FIG. 3 is a rear view of the handset shown in FIGS. 1 and 2.

DETAILED DESCRIPTION OF THE PREFERRED EMBODIMENTS

Figure 4:
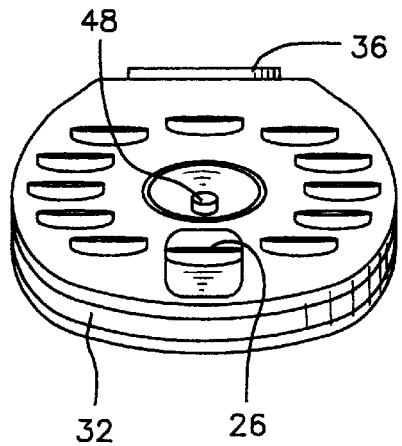
FIG. 4 is a top view of a handset.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 3, in particular, a telephone handset embodying the teachings of the subject invention is generally designated as 10. With reference to its orientation in FIG. 1, the telephone handset includes a base portion 12 and a head portion 14 which are joined together in a fixed or adjustable angular orientation.

As shown in FIG. 2, the head portion extends at an angle of between 60 and 70 degrees with respect to the base portion 12. The inclination of the head portion with respect to the base portion helps facilitate a comfortable gripping of the handset by the hand 16 of the user of the handset. With a comfortable grip of the base portion, the forefinger 18 is available to direct different electronic switches, in the form of buttons, so as to enter a plurality of telephone numbers.

In the handset of the present invention, there are several ways of dialing a telephone number. In one method, a plurality of buttons or keys 20a through 20l are spaced in a clock face pattern around the head portion 14 of the handset with a diameter of approximately two inches. These buttons are representative of the numerals 1 through 9, 0, "*" (star) and "i" (pound). In addition, buttons 20b through 20j include indicia as is traditionally associated with the number buttons of a known telephone.

The upper surface 22a through 22l of the buttons 20a through 20l are inclined at an angle of approximately 60 to 70 degrees. By the inclination of these surfaces, as shown in FIG. 2, the tip 24 of the forefinger 18 can slide up along the inclined surfaces of the buttons 20a through 20l in a natural pushing away motion to push down on these buttons so as to actuate them. These surfaces may include braille or other identifiers of a particular number or button.

Button surface 22l is slightly different from the remainder of the button surfaces 22a through 22k in that button 20l includes a projection 26 so as to familiarize the operator of the handset with the position of the button 20l located in the twelve o'clock position. Similarly, to make the operator of the handset aware of the particular buttons to be actuated, without visually reviewing the face of the handset, the button 20c, which includes the number "3" is positioned in the three o'clock position on the clock face. Similarly, button 20f having the "6" number on its face is positioned at the six o'clock position and button 20i have the "9" number is positioned in the nine o'clock orientation.

The button 20l, also in distinction to the buttons 20a through 20k, is slidable within a rectangular slot 28, for performing additional functions. When movable to a position 30 indicated by "ON" the handset is activated by its power source. Also, an antenna 32, shown in dotted lines in FIGS. 1 through 3 and in solid lines in FIG. 4, is extended from its recessed position as shown in FIG. 4 to the extended position shown in FIGS. 1 through 3. To terminate power to the handset, the button 20l is moved to the position 32 indicated by the term "OFF".

If, in dialing, an error is made or the entered string of numbers is to be erased, the button 20l is moved to the position 34 indicated by the term "ERASED". A quick motion of button 20l to position 34 will delete the previously entered number whereas an extended positioning of the button 20l at position 34 will erase the previously entered string of numbers.

In dialing a telephone number, each button 20a through 20l may be depressed. Upon depression of each button, a synthesized voice projecting through loud speaker 36, announces an identifier of the button pushed to confirm to the operator the correct entry of numbers. Loud speaker 36 also doubles as a loud speaker for hearing the other party in a telephone conversation when the handset is used in a hands free operation.

In addition, as each number is entered, the entered number appears on an LCD display 38 positioned on the rear side of the handset. To transmit a string of numbers, button 40 is depressed by the thumb when the handset is held in the right hand of the operator whereas button 42 is depressed by the thumb of the operator when the handset is held in the left hand of the operator.

In another mode of dialing the handset of the present invention, a swivel button 44 includes a concave rotatable circle plate 46. Projecting upwardly from the circle plate 46, is a pivot pin 48. The pivot pin is engaged by the tip 24 of the forefinger 18 of the operator as shown in FIGS. 1 and 2.

Figure 6:
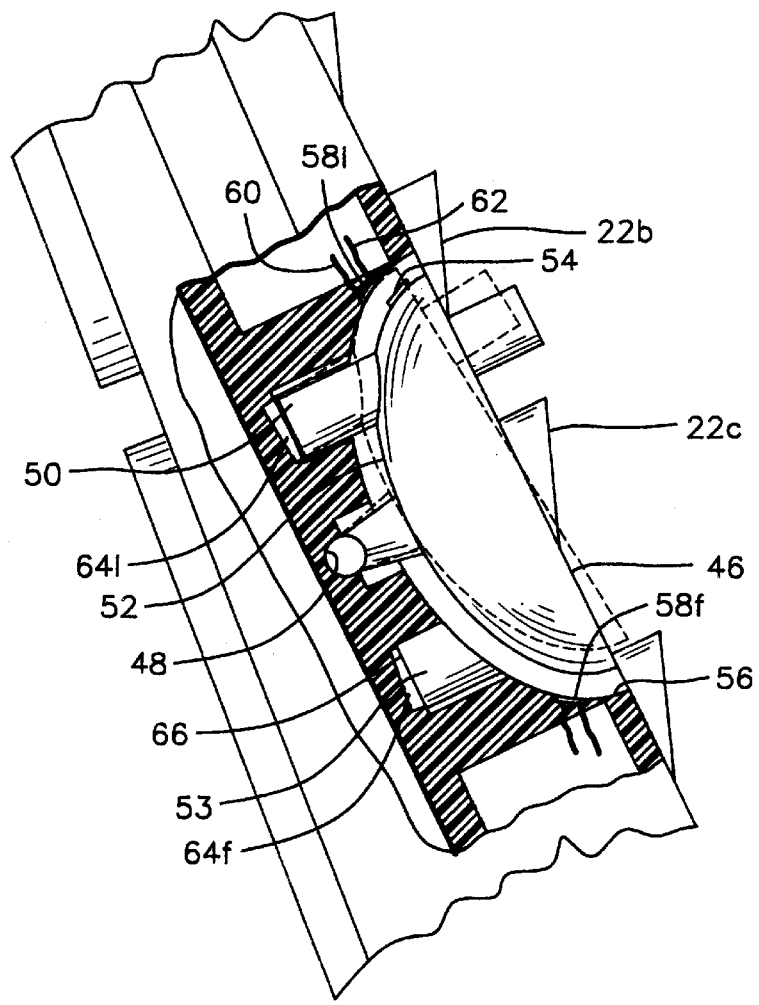
FIG. 6 is a sectional view taken along line 6-6 of FIG. 5 which shows the swivel button movable from a position shown in solid lines to a position shown in dotted lines by tilting of the projecting pivot pin so as to cause closing of a circuit to dial a particular telephone number while simultaneously moving a downward projection into a detent to provide the feel of engagement of the swivel button in a correct orientation for dialing of a telephone number which is simultaneously confirmed by a synthesized voice.

By movement of the pivot pin 48 in a clockwise or counter-clockwise direction, the pivot pin is moved adjacent to a particular button 20a through 20l. An extension of the circle plate 46 is pivotally mounted in a ball joint 48 as shown in FIG. 6. A downward projection 50 extending from the undersurface 52 of the circle plate 46 moves through an annular groove 53 positioned below the bottom surface 52 of the circle plate.

Figure 5:
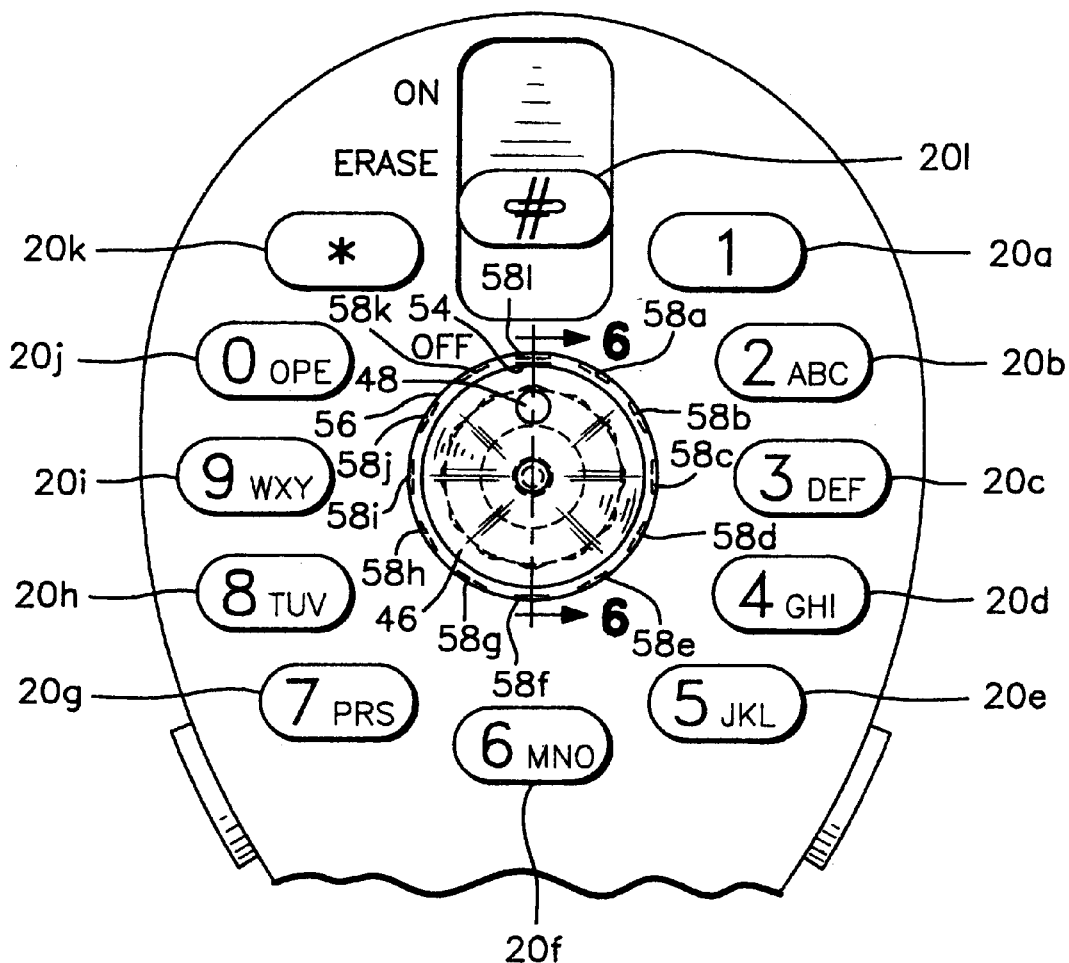
FIG. 5 is an enlarged view of the head portion of the handset illustrating the central swivel button contact switch and the twelve contacts spaced about the periphery of the swivel button and the actuating contact plate located on the swivel button so as to complete a circuit when touching one of the twelve contacts so as to dial a predetermined number in a telephone string.

As shown in FIG. 5, a metal contact plate 54 is located on the periphery of the circle plate 46. Spaced from the periphery of the circle plate 46, on the periphery of the recess 56 within which the circle plate 46 rotates, are twelve contacts switches 58a through 58l which correspond to the contact buttons 20a through 20l.

To dial a certain number, the pivot pin 48 is rotated to a position adjacent to a desired contact button 20a through 20l. The pivot pin is then tilted towards a particular contact button 20a through 20l as shown in dotted lines in FIG. 6. In FIG. 6, the contact plate 54 is moved toward contact switch 58l to close the circuit between two leads 60, 62 for generation of a signal representative of, in this example, button 20l. As with button 20l, a synthesized voice confirms the completion of a circuit similar to the depression of button 20l.

In addition, the downwardly extending projection 50 is forced into one of twelve spaced recesses 64l which is indicated by a clicking noise and which is felt by the tip of the forefinger of the operator resting on the pivot pin 48. The twelve spaced recesses 64a through 64l limit the pivoting of the circular plate into twelve discrete positions, corresponding to the twelve contact buttons 20a through 20l. This further confirms to the operator a correct positioning of the pivot pin to dial a particular number.

A spring 66 positioned in each of the recesses 64a through 64l will push the projection 50 out of the respective recess after the contact plate 54 has touched one of the contact switches 58a through 58l to dial a particular number. The dialed number is confirmed by a synthesized voice. The pivot pin 48 may then be rotated to another position to enter another number.

The handset of the present invention may also be used in a traditional manner by use of microphone 67 and loud speaker 68 positioned on the rear of the handset.

By the present invention, a plurality of ways are provided for dialing a telephone without having to look at the telephone to determine the proper numbers to be entered. This is achieved by a clock face pattern of numbers, whether it be round, square, oval, rectangular or other pattern, for example. However, each of the numbers is positioned in a pattern corresponding to a clock face so that a proper number can be depressed without having to have the operator take their eyes off of the road, if driving.

In addition, a rotatable plate having a pivot pin for providing a point of reference during rotation of the plate provides twelve discrete actuation points into which the pivot pin may be leaned so as to dial a particular number. Under both dialing patterns, a synthesized voice confirms the dialing of a particular number so as to confirm to the operator that the correct number has been entered. A synthesized voice may also confirm other functions of the handset, as desired.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A telephone handset comprising:

a body including two distinct portions, a lower or a base portion and an upper or a head portion extending at an angle with respect to said base portion, a plurality of keys on said head portion, said keys being representative of numbers used in dialing a telephone and being actuable by a forefinger of an operator of the handset cradling the base portion in a palm of the hand of the operator and held by the thumb and the other three fingers of the hand, and a rotatable and pivotal plate located on said head portion, said plate being rotatable to a plurality of predetermined positions associated with numbers used in dialing a telephone and said plate being pivotal to complete a circuit upon tilting of said plate for dialing a number of a telephone, said keys and said rotatable and pivotal plate being separately actuable for dialing a telephone by a forefinger of an operator of the telephone handset cradling the base portion in a palm of the hand of the operator and held by the thumb and the other three fingers of the hand.

2. A telephone handset as claimed in claim 1, wherein the keys are arranged in a clock-face pattern.

3. A telephone handset as claimed in claim 1, an upper surface of said keys is inclined with respect to said head portion.

4. A telephone handset as claimed in claim 1, wherein one of the keys is slidable to perform an on/off function.

5. A telephone handset as claimed in claim 1, wherein a periphery of said rotatable plate includes a contact plate.

6. A telephone handset as claimed in claim 5, wherein a periphery of an opening of said head portion within which said rotatable plate is mounted includes a plurality of contact switches for engagement by said contact plate.

7. A telephone handset comprising:

a head portion, and a plate rotatably mounted on said head portion, said plate being tiltable to complete a circuit for dialing a telephone number, said head portion extending at an angle to a base portion of the telephone handset, said plate being centrally mounted on said head portion so that the plate is rotated by a forefinger of an operator of the telephone handset cradling the base portion of the telephone handset in a palm of the operator of the telephone handset, a pin extending from an upper surface of the plate for engagement by the forefinger of the operator holding the telephone handset, a projection extends from beneath the plate into an annular groove defined by the head portion for guiding rotation of the handset, and a plurality of recesses spaced along said annular groove defining discrete engagement areas for the projection so as to identify by feel and sound, the engagement of the projection into one of the recesses.

8. A telephone as claimed in claim 7, wherein a contact switch is associated with each of the recesses, the contact switch of each recess being engageable by a contact plate on the rotatable plate by tilting of the rotatable plate and engagement of the projection in one of the recesses.

9. A telephone handset comprising:

a base portion, a head portion extending at an angle with respect to said base portion, a plurality of keys on said head portion aligned to form a circle, and a rotatable plate mounted on said head portion within the circle defined by the plurality of keys, said keys and said rotatable plate being separately actuable for dialing a telephone by a forefinger of an operator of the telephone handset cradling the base portion in a palm of the hand of the operator and held by the thumb and the other three fingers of the hand.

10. A telephone handset as claimed in claim 9, wherein a synthesized voice confirms dialing of each number of the keys and the rotatable plate.

11. A telephone handset as claimed in claim 9, wherein the keys are arranged in a clock-face pattern.

12. A telephone handset as claimed in claim 11, an upper surface of said keys is inclined with respect to said head portion.

13. A telephone handset as claimed in claim 9, wherein a projection extends from the plate into an annular groove defined by the head portion for guiding rotation of the handset.

14. A telephone as claimed in claim 13, wherein a plurality of recesses spaced along said annular groove define discrete engagement areas for the projection so as to identify by feel and sound, the engagement of the projection into one of the recesses.

* * * * *